United States Patent [19]

Tow

[11] Patent Number: 5,730,420
[45] Date of Patent: Mar. 24, 1998

[54] BALL VALVE HAVING ONE-PIECE PACKING

[75] Inventor: John P. Tow, Douglasville, Ga.

[73] Assignee: Parker-Hannifin Corporation, Cleveland, Ohio

[21] Appl. No.: 704,491

[22] Filed: Aug. 8, 1996

Related U.S. Application Data

[60] Provisional application No. 60/003,835, Sep. 15, 1995.
[51] Int. Cl.$^6$ .................................................. F16K 5/06
[52] U.S. Cl. ............................... 251/315.12; 251/315.05
[58] Field of Search ........................ 251/315.12, 315.16, 251/315.15, 315.05

[56] References Cited

U.S. PATENT DOCUMENTS

| | | |
|---|---|---|
| 944,598 | 12/1909 | Caskey . |
| 1,784,381 | 12/1930 | O'Stroske . |
| 2,110,098 | 3/1938 | Strecker . |
| 2,751,185 | 6/1956 | Shand . |
| 2,799,470 | 7/1957 | Margrave . |
| 2,885,179 | 5/1959 | Hartmann . |
| 3,030,068 | 4/1962 | Priese . |
| 3,041,036 | 6/1962 | McFarland . |
| 3,108,779 | 10/1963 | Anderson . |
| 3,168,900 | 2/1965 | Hansen et al. . |
| 3,181,834 | 5/1965 | Jennings et al. . |
| 3,199,835 | 8/1965 | Freed ............................. 251/309 |
| 3,223,111 | 12/1965 | Anderson . |
| 3,236,495 | 2/1966 | Buchholz . |
| 3,266,769 | 8/1966 | Shand . |
| 3,441,249 | 4/1969 | Aslan . |
| 3,445,087 | 5/1969 | Priese et al. . |
| 3,472,270 | 10/1969 | Masheder . |
| 3,675,895 | 7/1972 | Matousek . |
| 3,735,956 | 5/1973 | Matousek . |
| 4,020,864 | 5/1977 | Church, Jr. . |
| 4,026,516 | 5/1977 | Matousek . |
| 4,410,165 | 10/1983 | Koch et al. . |
| 4,423,749 | 1/1984 | Schmidt ..................... 251/315.12 X |
| 4,441,524 | 4/1984 | Mese . |
| 4,479,513 | 10/1984 | Koch et al. . |
| 4,540,012 | 9/1985 | Bridges . |
| 4,572,239 | 2/1986 | Koch et al. . |
| 4,602,762 | 7/1986 | Koch et al. . |
| 4,660,591 | 4/1987 | Brown et al. . |
| 4,671,308 | 6/1987 | Williams et al. . |
| 4,685,488 | 8/1987 | Corbin et al. . |
| 4,750,708 | 6/1988 | Yusko, Jr. et al. . |
| 4,762,301 | 8/1988 | Wozniak et al. . |
| 4,792,118 | 12/1988 | Yusko, Jr. et al. . |
| 4,893,781 | 1/1990 | Kalain et al. . |
| 5,595,206 | 1/1997 | Vega . |

FOREIGN PATENT DOCUMENTS 0 474 318 A2  11/1992  European Pat. Off. .

*Primary Examiner*—John Fox
*Attorney, Agent, or Firm*—Christopher H. Hunter

[57] ABSTRACT

A ball valve has a body with a cylindrical bore extending axially inwardly from the exterior of the body and defining a valve chamber. Inlet and outlet passages extend from the exterior of the body inwardly to the chamber. A ball valve member is disposed within the chamber and has an operating stem extending axially within the chamber to a position exterior of the body. A mass of packing material surrounds said ball valve member and substantially fills a portion of the chamber. The packing material initially has a smooth cylindrical outer configuration which matches the cylindrical surface configuration of the chamber. The body further includes a plurality of splines extending axially along the interior surface of the chamber. A flat washer and a packing ring are located around the operating stem of the ball the valve member, and a packing nut applies a bias force through the washer to the packing. When the biasing force is applied against the packing, the packing ring drives against the packing and the packing material within the chamber cold-flows into the splines in the body to prevent rotational displacement of the packing material in said chamber and to reduce leak paths between the mass of packing material and the chamber.

9 Claims, 3 Drawing Sheets

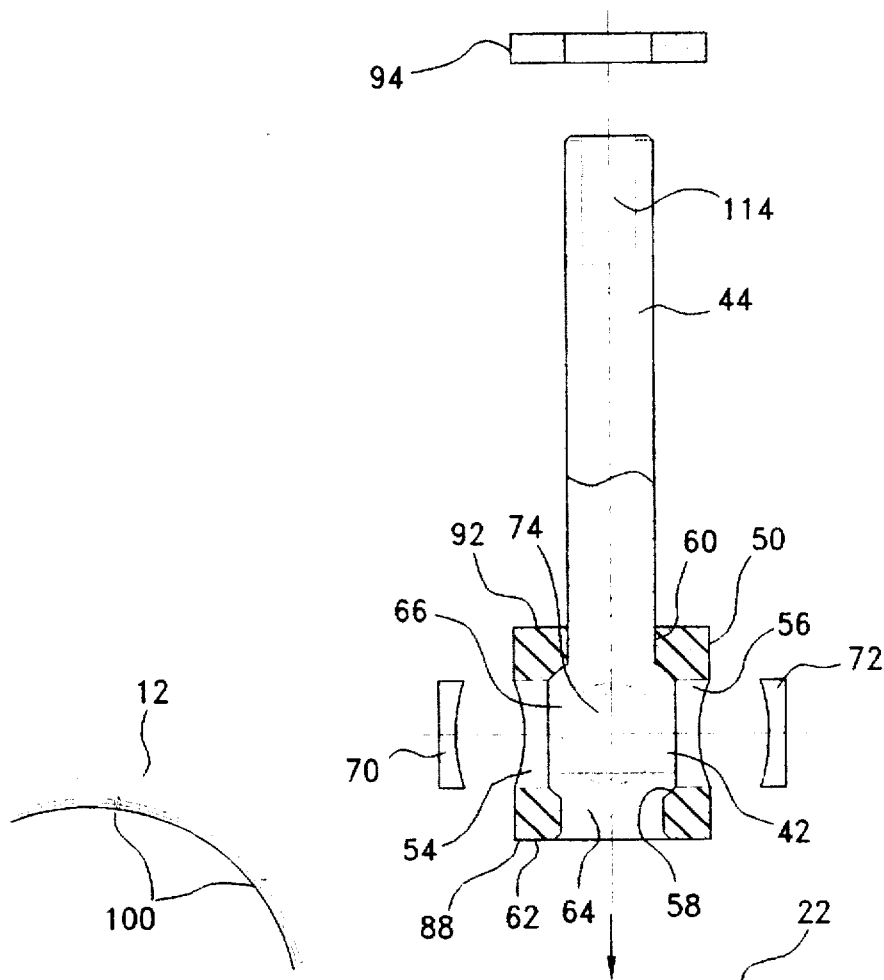
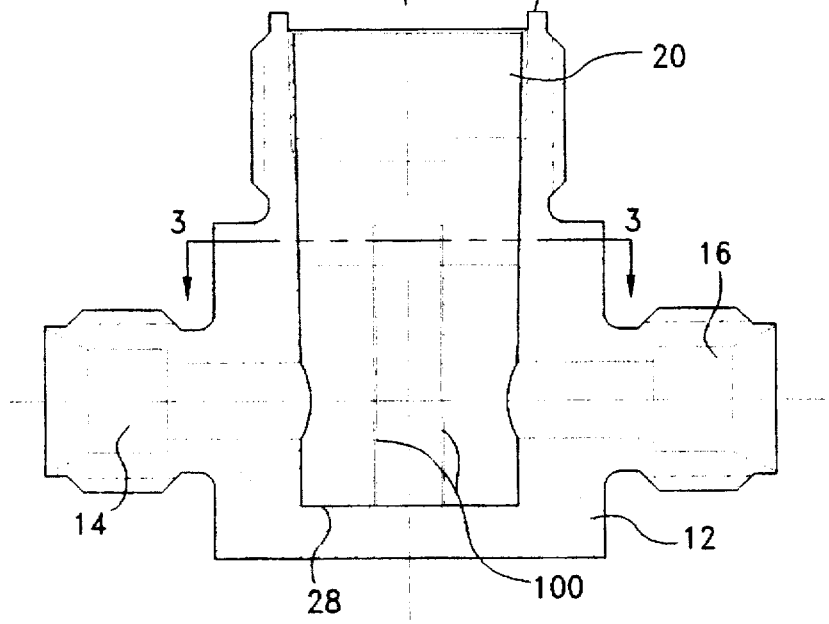

BALL VALVE HAVING ONE-PIECE PACKING

This application claims the benefit of U.S. Provisional application No.: 60/003,835, Sep. 15, 1995.

FIELD OF THE INVENTION

The present invention relates generally to valves, and more particularly to ball valves.

BACKGROUND OF THE INVENTION

Valves suitable for use in instruments and instrumentation systems are well known. One particular useful type of valve for these systems comprises a ball valve. Generally, a ball valve includes a housing or body having an internal valve chamber within inlet and outlet passages. A ball valve member is disposed within the internal valve chamber. The ball valve member comprises a stainless steel ball positioned centrally within the chamber and a cylindrical valve stem which extends from the ball axially through the chamber to a location outside the body. A packing surrounds the ball and stem and fills substantially all the voids between the ball and the chamber, except for passages which extend from the inlet and outlet passages in the body to the ball. A handle attached to the operating stem allows the ball to be rotated, thereby selectively aligning passages in the ball with the inlet and outlet passages in the body. The ball valve can be a two-way valve with a single inlet and single outlet passage, or a three-way valve with a single inlet and a pair of outlet passages or a pair of inlet passages and one outlet passage, as the particular application requires. The above type of ball valve is illustrated in Matousek, U.S. Pat. Nos. 3,675,895 and 3,735,956; Hartmann, U.S. Pat. No. 2,885,179; Priece, U.S. Pat. No. 3,030,068; Corbin, U.S. Pat. No. 4,685,488; McFarland, Jr., U.S. Pat. No. 3,041,036; among others.

In general, the above valves include a two-piece packing formed from e.g., polytetraflouro-ethylene (PTFE), polyethylene, or some other synthetic resin. Each packing member comprises an annular base or shell having a concave, semi-circular contact surface which cradles a portion of the ball of the ball valve member. The packing members mate together to retain the ball in the spherical cavity defined therebetween. The synthetic resin material of the packing members is resistant to wear, but nevertheless allows the ball to rotate substantially unimpeded within the spherical cavity of the packing. The operating stem extends through a bore formed in the upper packing member to an exterior location outside the body. A packing nut and multiple washers and/or spring washers are then disposed around the operating stem to provide a compressive preload against the upper packing member, thereby putting the packing members in compression against one another. Corbin, U.S. Pat. No. 4,685,488, for example, shows an annular gland member located over the operating stem and engaging the ball packing, and a plurality of disk springs located over the operating stem and biased by a packing nut against the gland member to provide a biasing force to the packing.

The use of multiple gland members, washers and spring washers as described above, however, increase the parts and material requirements for the ball valve and can increases the assembly and repair steps for the valve, thereby increasing the overall cost of manufacturing and servicing the valve. In addition, leak paths can form between the packing and the valve chamber, and between the ball and packing members themselves, due to unequal loading of the packing members, and accumulation of component tolerances.

It is known that ball valves have been developed with a one-piece rubber seat or liner surrounding the ball valve which decreases the leak paths around the ball valve, and a single biasing washer which reduces the number of parts necessary for the ball valve. This type of ball valve is shown in Hansen, et al., U.S. Pat. No. 3,168,900. Hansen also provides a pair of opposed, outwardly-extending axial lugs in the rubber seat which mate with corresponding channels formed in the housing. The lugs reinforce the seat and prevent rotation of the seat with respect to the valve casing. The rubber liner, however, can be time-consuming and difficult to mold with the lugs, can be time-consuming to locate in the proper orientation in the valve casing, and can be susceptible to chemical, pressure and temperature degradation.

As such, while the above ball valves might be appropriate in certain applications, it is believed that there is a demand in the industry for a further improved ball valve which is easy to manufacture, assemble and service, can operate over a wide range of temperatures and pressures, and is resistant to a wide range of chemicals.

SUMMARY OF THE INVENTION

The present invention provides a ball valve which uses few components which are easy to manufacture and which are resistant to a wide range of pressures, temperatures and chemicals. The packing for the ball valve is easy to locate within the valve housing, which reduces assembly service and repair time, and hence reduces the overall cost of the bah valve. The improved structure of the bah valve prevents leak paths between the packing and the interior chamber of the body, while still preventing the packing from rotating within the valve chamber during use.

According the principles of the present invention, the packing for the ball valve member is formed in one piece by injection molding the packing around the ball of the ball valve member. Preferably the packing is formed from pliant plastic (injection-moldable) synthetic resin material, for example Teflon® PFA. The packing has a smooth, outer cylindrical form which is simple to manufacture. The packing tightly surrounds the ball of the valve member, yet allows the ball to rotate in the packing without interference.

Axially-extending splines (i.e., thin channels) are provided in spaced-apart relation along the interior surface of the chamber. The splines are easy to form and extend from the bottom wall of the chamber upwardly for a distance which is at least the entire axial length of the packing. Preferably, two splines are disposed on each semi-circular half of the chamber in equal, spaced-apart relation.

When the packing (with the ball valve member) is located within the ball valve chamber, a single washer is disposed around the stem of the ball valve member and a packing nut is tightened down against the washer to provide a biasing force on the packing. Under the biasing force, the packing cold-flows into the splines formed in the chamber wall. The cooperation between the packing and the splines prevents the packing from rotating within the chamber. The cold flow of the packing into the spline also prevents leak paths between the packing and the chamber wall. A packing ring with a wedge-shaped design can also be provided between the washer and the packing to force the packing outwardly into the splines and thereby improve the seal between the packing and the chamber and to reduce the operating torque of the valve assembly. The ball valve member and packing can be easily removed from the valve chamber for repair or replacement by removing the packing nut and the washer.

As such, the present invention provides a ball valve which has a few, easy to fabricate and assemble components, has a packing which can be easily located in or removed from the housing to reduce assembly and repair costs, and which prevents leak paths and rotation of the packing in the housing.

Other features and advantages of the present invention will become further apparent upon reviewing the following specification and attached drawings.

BRIEF DESCRIPTION OF THE DRAWINGS

FIG. 2 is a partially assembled view of certain components of the ball valve with FIG. 1;

FIG. 3 is a cross-sectional view of a portion of the ball valve taken substantially along the plane described by the lines 3—3 of FIG. 2.

DETAILED DESCRIPTION OF THE PREFERRED EMBODIMENT

Figure 1:
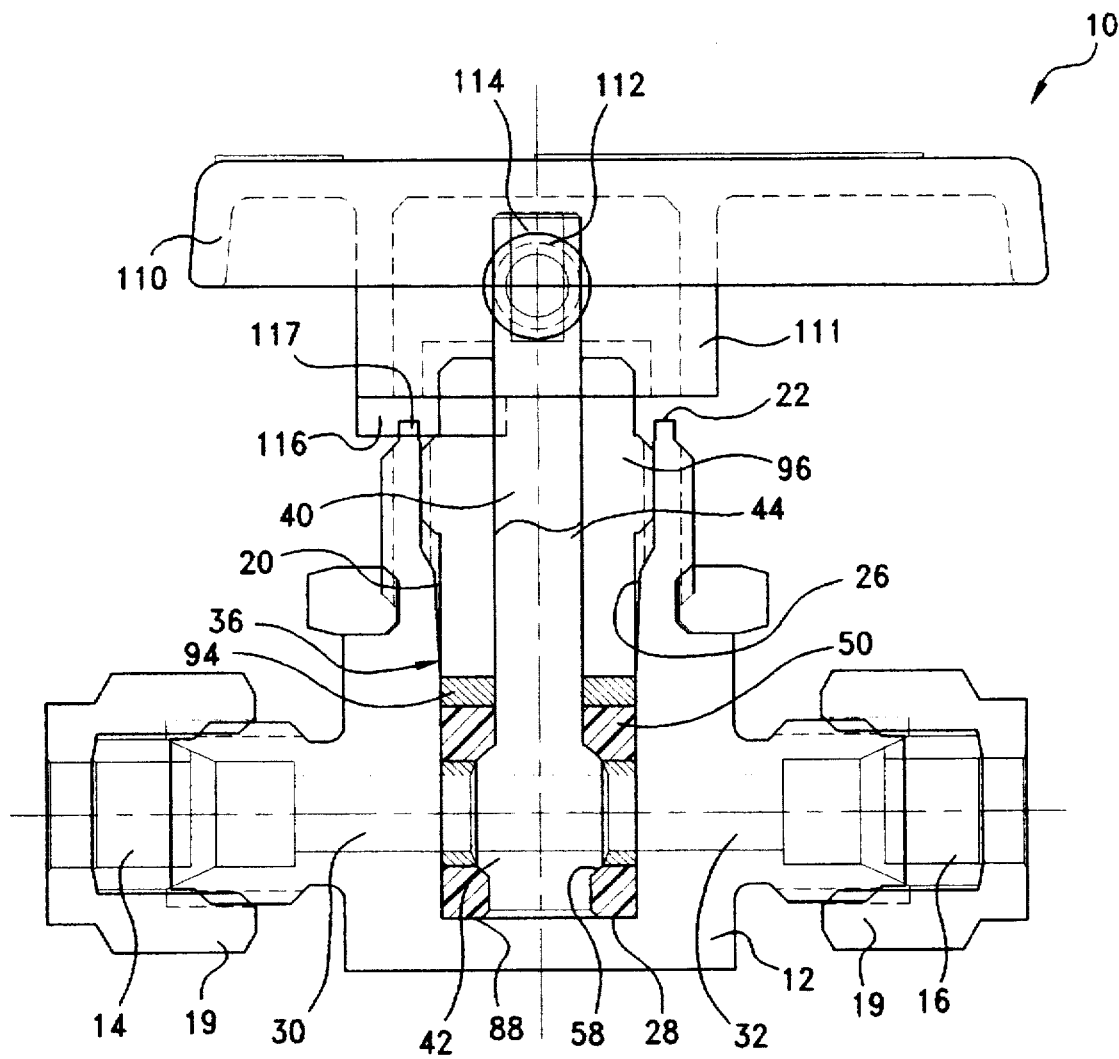
FIG. 1 is a cross-sectional view of a ball valve constructed according to the principles of the present invention.

Referring to the drawings, and initially to FIGS. 1 and 2, a ball valve constructed according to the principles of the present invention is illustrated generally at 10. The ball valve 10 includes a body, casing or housing 12 having an inlet port or passage 14 and an outlet port or passage 16. Each port typically includes a threaded inner passageway or a threaded exterior surface for permitting the valve to be suitably attached within a fluid system. For purposes of illustration, a valve sleeve or nut 19 is threadably attached to each port to allow interconnection within a fluid system. While the ball valve 10 is disclosed in FIG. 1 as comprising as a two-port ball valve, it is within the present invention to modify the ball valve so as to have three or more port(s), as should be apparent to those skilled in the art. Reference may be had to a three-port structure shown in U.S. Pat. No. 4,685,488.

The body 12 of the valve includes a cylindrical bore 20 which extends axially inward from an annular opening or mouth 22. The cylindrical bore 20 includes side walls 26 and a flat bottom end wall 28 which extends across the sidewalls, and which together with the sidewalls define a cylinder cavity. A pair of fluid passages radially intersect cylindrical bore 20. Specifically, inlet passage 30 extends radially inward toward cylindrical bore 20 to interconnect inlet port 14 with the cylinder cavity; while outlet passage 32 extends radially inwardly toward the cylindrical bore to interconnect outlet port 16 with the cylinder cavity. Passages 30 and 32 are located proximate end wall 28 in the bore and preferably, inlet passage 30 is diametrically opposite from outlet passage 32, although this can vary depending upon the particular application.

A valve assembly, indicated generally at 36, is disposed within cylindrical bore 20. Valve assembly 36 includes a valve member 40 comprising a valve ball 42 and an axially-extending valve stem 44. Preferably, ball 42 and stem 44 are formed in one piece from e.g., stainless steel, in a manner which is well-known to those skilled in the art, such as by machining bar stock. The valve assembly further includes packing 50 which surrounds the ball 42 of the ball valve member. Packing 50 has a smooth cylindrical outer surface which has substantially the same diameter as the cylindrical sidewalls 26 of bore 20. As shown most clearly in FIG. 2, an inlet passage 54 and an outlet passage 56 are formed on diametrically opposite sides of packing 50 and open into a central ball chamber. The central ball chamber is defined by smooth spherical inner wall 58 of the packing. Inlet passage 54 in packing 50 is aligned with inlet passage 14 in body 12, while outlet passage 56 in packing 50 is aligned with outlet passage 16 in body 12. The central ball chamber in packing 50 closely receives ball 42 of the ball valve member. An opening 60 extends axially upward through packing 50 and closely surrounds stem 44, while a lower opening 62 surrounds an axially and downwardly-extending trunion 64 which extends from the bottom of ball 42 into opening 62. Ball 42 is thus supported within the inner walls 58 of packing 50 between upper opening 60 and lower opening 62.

Preferably, packing 50 is formed from a pliable plastic material which can be injected-molded around the ball and stem. Preferably, this material is Teflon® PFA (perfluoroalkoxy), although it could be other appropriate, injection-moldable, synthetic resin material which is resistant to a wide range of chemicals, temperatures and pressures, as should be apparent to those skilled in the art. The injected-molded Teflon® PFA eliminates tolerance stack-ups and leak paths around the ball and stem. Methods for injection molding the material around the ball valve are conventional and should also be well-known to those skilled in the art. In any case, the packing surrounds the ball and stem in a fairly tight manner but allows the ball to rotate within the packing without appreciable resistance. The packing also initially has a smooth cylindrical outer surface which is relatively simple and straight forward to manufacture, as compared to non-cylindrical forms.

Valve ball 42 includes a passageway 66 which extends diametrically through the ball 42 in a direction substantially perpendicular to the axis of the valve stem. As such, rotation of stem 44 selectively aligns passage 66 in ball 42 with the inlet passage 54 and the outlet passage 56 in packing 50, and thus with inlet 14 and outlet 16 in body 12.

To prevent packing 50 from extruding into central passage 66 of the valve ball 42, retainer rings are inserted within passages 54 and 56. In particular, a first retaining ring 70 is inserted within annular passage 54, while a second retainer ring 72 is inserted within annular passage 56. Each retainer ring has a concave interior surface which substantially matches the spherical outer surface of the portion of the ball 42 that the ring abuts. Retainer rings 70 and 72 are formed of a material which is more rigid than packing 50, for example metal, and hence prevent extrusion of the packing material into the central passage of the valve ball. Solid retaining disks are disposed 90 degrees apart from retaining rings 70 and 72 for the same purpose. That is, retaining disks, one of which is indicated in phantom at 74 in FIG. 2, are disposed in radial passages formed in packing 50 at 90 degree offsets from passages 54 and 56. These retaining disks are also formed of a material which is more rigid than packing 50, for example steel, and prevent extrusion of the packing into the central passage 66 of ball 42 when ball 42 is perpendicular with inlet passage 54 or outlet passage 56.

The valve assembly can be easily inserted into the chamber 20 of body 12. To this end, the valve assembly is inserted axially through opening 22 of body 12 until the lower surface 88 of packing 50 bottoms against the end wall 28 of the chamber 20. The packing 50 is inserted within body 12 such that inlet passage 54 is aligned with inlet 14 in body 12, and outlet passage 56 is aligned with outlet 16 in body 12. The smooth outer cylindrical shape of the packing 50 is tightly but easily received Within the cylindrical interior surface of chamber 20.

Referring again to FIG. 1, after packing 50 is located within body 12, a single flat annular washer 94 is disposed in bore 20 against the upper surface 92 of the packing 50. The annular washer 94 has an outer periphery which substantially matches the inner circumference of bore 20, and has a central annular opening which closely receives stem 44. A packing nut 96 is then disposed within bore 20 to apply a biasing force against washer 94, and hence against packing 50. Packing nut 96 includes exterior threads which mate with corresponding threads on the interior surface of bore 20 to retain packing nut 96 within the bore. Packing nut 96 can include an exterior surface configuration, for example a hex configuration, which enables access with conventional tools to tighten packing nut 96 against washer 94.

To prevent rotation of packing 50 when ball valve member 40 is rotated by handle 80, a series of splines or broach lines (i.e., thin grooves or channels) are formed axially along the inner surface of chamber 20. As shown in FIGS. 2 and 3, each spline 100 extends axially upwardly from end wall 28 a distance which is at least as great as the axial length of packing 50. At least one spline, and preferably at least two splines, are located on each semi-circular half of bore 20 between the inlet passage 14 and the outlet passage 12. As such, preferably at least four splines are spaced around the cylindrical bore 20 in equal spaced-apart relation to each other. The splines can be easily formed in the surface of chamber 20 such as by cutting the surface of the chamber with a broach. The depth of the splines can vary depending upon the particular application, but it has been determined that a V-shaped channel having a depth of only 0.2 mm is for most commercial applications. When the packing nut 96 is tightened down against washer 94, and hence against the upper surface of packing 50, the packing is compressed, which causes the resilient, pliant material forming packing 50 to deform by cold-flow into splines 100. The packing cold-flows evenly and fills the splines entirely. The cooperation between the deformed packing and the splines tightly holds packing 50 within body 12 and prevents rotation thereof. Moreover, the cold-flow of packing 50 into splines 100 prevents circumferential leak paths between packing 50 and body 12. Of course, being only one piece, there are no leak paths in the packing itself, as can occur with two-piece packings. The cooperation between packing 50 and splines 100 thereby provides a simple mechanical device which (i) prevents rotation of packing 50, and (ii) prevents leak paths between packing 50 and body 12.

Referring again to FIG. 1, the upper end of stem 44 extends exteriorly of body 12 and is attached to a handle 110. Handle 110 is of conventional design and includes a downwardly-extending annular collar 111 which receives the distal end of stem 44, and a screw or other fastening member 112 which can be tightened down into a groove or keyway 114 in the upper distal end of stem 44 to fix the handle 110 to stem 44. Handle 110 further includes a stop 116 which is designed to engage a flange 117 on opening 22 to limit the rotational movement of the handle. Thus, when handle 110 is turned, ball valve member 40 is rotated to selectively allow fluid to flow between the inlet passage 14 and the outlet passage 16 in body 12.

Figure 4:
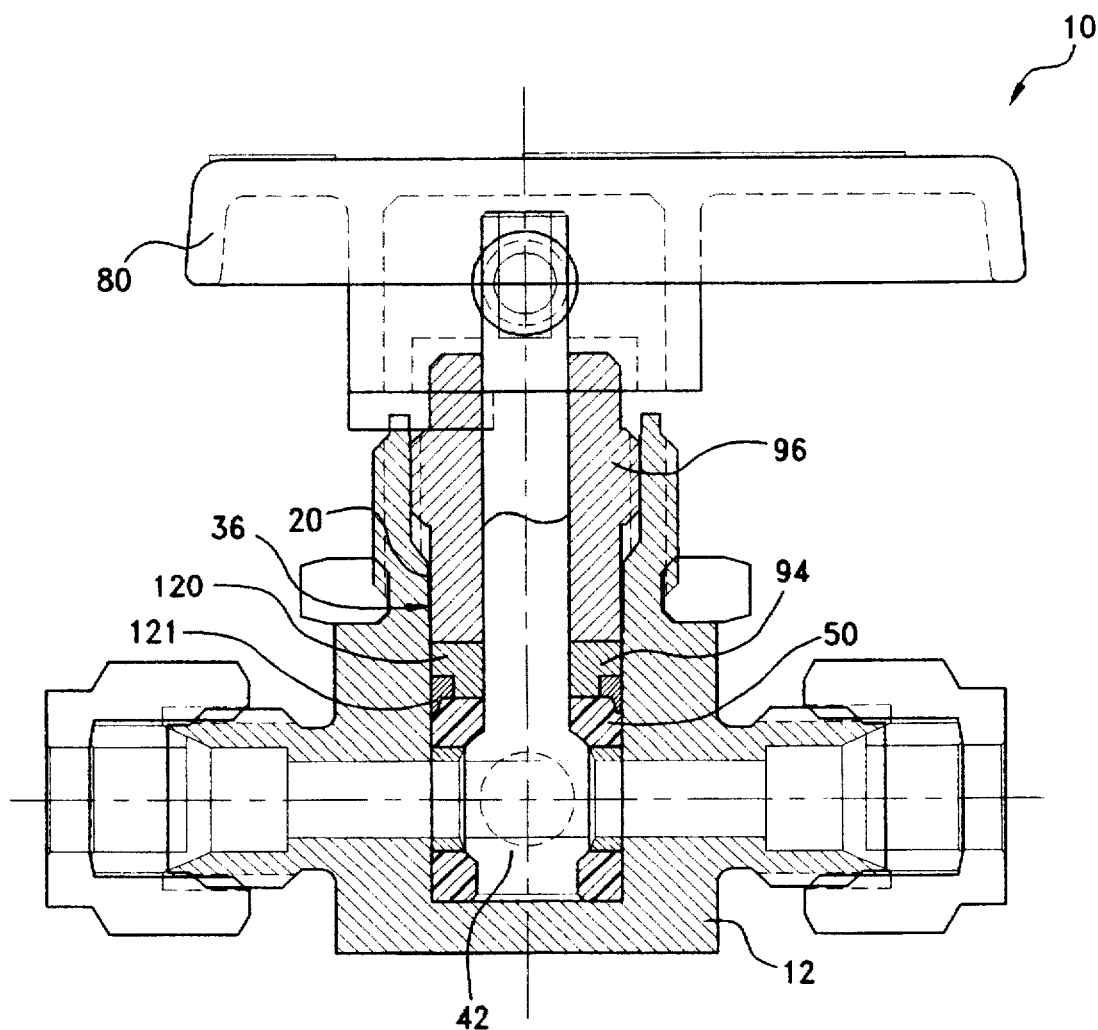
FIG. 4 is a cross-sectional view of a ball valve constructed according to an additional aspect of the present invention.

According to a further aspect of the present invention, as illustrated in FIG. 4, a packing ring 120 can be used to facilitate forming the seal between packing 50 and the inside surface of cylinder bore. Specifically, packing ring 120 can have an annular wedge-shaped portion 121 extending downwardly and contacting packing 50. The packing ring is preferably formed from a material which is harder than packing 50, for example stainless steel. Wedge-shaped portion 121 tapers slightly inwardly toward the axis of the bore. According to this aspect, washer 94 has an annular ring or groove on its lower outside surface to closely receive packing ring 120. Packing ring 120 preferably has an outside diameter which corresponds to the outside diameter of washer 94.

When the packing 50 is assembled within body 12 (as described previously), packing nut 96 applies a biasing force against both washer 94 as well as packing ring 120. In so doing, annular wedge 121 cuts or "bites" into the relatively softer material of packing 50, thereby driving the material of packing 50 on the outside diameter of wedge 121 radially outward into contact with the inner surface of cylindrical bore 20. This facilitates the cold-flow of the packing 50 into splines 100 (FIG. 2). Wedge 121 also prevents radial leak paths between washer 94 and packing 50.

In this aspect, the torque necessary to tighten down packing nut 96 to compress packing 50 is also reduced because the cold-flow of the packing into the splines is accomplished with the aid of the packing ring. The reduced torque increases the reliability and the reusability of the packing nut and washer. With less torque applied against valve ball, ball valve member 40 is also easier to turn.

While in this aspect packing ring 120 is disclosed as being formed as a separate piece from washer 94, and it is also conceivable that packing ring 120 and washer 94 could be formed in one piece with an annular wedge or other geometrically deformed portion on the lower surface of washer 94. The geometrically-deformed portion would contact the top surface of packing 50 and cause packing 50 to deform outwardly into engagement with the inside surface of cylindrical bore 20, as described above.

To repair or replace the valve assembly 36, or any of its constituent components, the valve assembly can be easily accessed by removing handle 80, removing (unscrewing) packing nut 96 and removing (axially sliding) the washer 94 and the ball valve member 40 (with packing 50) out of cylindrical bore 20. A new or serviced valve assembly 36 can then be replaced in the bore as described above.

Thus, as described above, the present invention provides a new and improved ball valve which has few components which are easy to manufacture which are resistant to a wide range of chemicals, pressures and temperatures, a packing for the ball valve member which is easy to locate within the valve housing to facilitate assembly, service and repair, and which prevents leak paths between the packing and the interior chamber of the valve body, while still preventing the packing from rotating during use.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:
1. A ball valve, comprising:
 a body having a cylindrical bore extending axially inwardly from the exterior of the body and defining a valve chamber, and inlet and outlet passages extending from the exterior of the body inwardly to said chamber;
 a ball valve member disposed within said chamber and having an operating stem extending axially within said chamber to a position exterior to said body;

a mass of plastic packing material surrounding said ball valve member and substantially filling a portion of said chamber, said mass of packing material having an exterior surface diameter which is substantially the same as an interior surface diameter of said chamber, said body further including a plurality of splines extending axially along the interior surface of said chamber and defining thin grooves, said mass of packing material within said chamber cooperating with said splines to prevent rotational displacement of said mass of packing material in said chamber and to reduce leak paths between the mass of packing material and the chamber.

2. The ball valve as in claim 1, further including biasing means for applying a biasing force against said packing material wherein said mass of packing material cold-flows into said splines.

3. The ball valve as in claim 2, wherein said mass of packing material is formed from an injection-moldable plastic material.

4. The ball valve as in claim 1, wherein said splines are disposed circumferentially around said chamber on opposite semicircular segments of said chamber.

5. The ball valve as in claim 4, wherein two splines are disposed on each semicircular segment around said chamber.

6. The ball valve as in claim 1, wherein said chamber includes an interior end wall which supports said mass of packing material and said splines extending axially from said end wall through the portion of the chamber that is filled by the mass of packing material such that the splines extend along the entire axial length of said mass of packing material.

7. The ball valve as in claim 1, further including a washer disposed in said chamber around said operating stem and against said mass of packing material, and a packing nut disposed in said chamber also around said operating stem in engagement with said washer for applying a biasing force against said mass of packing material.

8. The ball valve has in claim 7, further including a packing ring disposed in said chamber between said washer and said packing material, said packing ring having a geometrically-deformed portion which cuts into a surface of packing material and forces said packing material radially outwardly against said interior surface of said chamber when said packing nut applies said basing force against said washer.

9. The ball valve as in claim 8, wherein said packing ring includes an annular wedge-shaped surface in contact with said packing material for forcing said packing material radially outward.

* * * * *